United States Patent [19]

Ito et al.

[11] Patent Number: 5,039,838
[45] Date of Patent: Aug. 13, 1991

[54] CORDLESS IRON HAVING A HEATER WHOSE TEMPERATURE IS CONTROLLED BY USING PULSE SIGNAL

[75] Inventors: Shinichi Ito, Kobe; Keiichi Ogiso, Osaka, both of Japan

[73] Assignee: Matsushita Electric Industrial Co., Ltd., Japan

[21] Appl. No.: 236,998

[22] Filed: Aug. 26, 1988

[30] Foreign Application Priority Data

Aug. 28, 1987 [JP] Japan ................ 62-215626

[51] Int. Cl.[5] .................... H05B 1/02
[52] U.S. Cl. .................... 219/251; 219/501; 219/497; 219/505; 219/247; 219/250; 38/82
[58] Field of Search .......... 217/494, 497, 499, 501, 217/505, 506, 246, 247, 249, 250, 251, 252; 38/81, 82, 88

[56] References Cited

U.S. PATENT DOCUMENTS

| | | | |
|---|---|---|---|
| 3,637,984 | 1/1972 | Irvine | 219/501 |
| 4,423,344 | 4/1984 | Yasuda | 219/497 |
| 4,430,553 | 2/1984 | Antimovski | 219/247 |
| 4,540,877 | 9/1985 | Zelinka et al. | 219/497 |
| 4,827,104 | 5/1989 | Foster, Jr. | 219/251 |

FOREIGN PATENT DOCUMENTS

8706411 7/1987 Fed. Rep. of Germany .
2335996 7/1977 France .
0056000 4/1985 Japan .................... 219/247
1569314 12/1976 United Kingdom .

*Primary Examiner*—M. H. Paschall
*Attorney, Agent, or Firm*—Lowe, Price, LeBlanc & Becker

[57] ABSTRACT

In the cordless iron assembly, an iron (10) includes a base (11), a heater (12) for heating the base (11), a thermosensitive element (13) for sensing the temperature of the base (11), a temperature detecting circuit (14), and terminals (P1, P2, P3, and P4), and a stand (15) including a terminals (P5, P6, P7, and P8), a pulse detecting circuit (16), a temperature control circuit (17), and a cord (18). The temperature detecting circuit (14) produces a pulse signal in accordance with the temperature signal outputted from the thermosensitive element (13). The pulse signal detecting circuit (16) receives the pulse signal, and outputs the pulse signal to the temperature control circuit (17). By the temperature control circuit (17), the temperature of the heater (12) is controlled in accordance with the plate signal whereby the base temperature of the iron (10) can be correctly controlled when the iron (10) is supported on the stand (15). The pulse signal can be communicated by an electrical circuit or an optical link, possibly including an infra-red emitting diode or can be superimposed on the current supply connecting to the heater.

11 Claims, 5 Drawing Sheets

CORDLESS IRON HAVING A HEATER WHOSE TEMPERATURE IS CONTROLLED BY USING PULSE SIGNAL

BACKGROUND OF THE INVENTION

1. Field of the Invention

This invention relates generally to electric irons and particularly to a cordless iron formed of a hand-held iron portion and a stand for the hand-held iron portion so arranged that heating electric power is supplied to the hand-held iron portion while the hand-held iron portion is supported on the stand.

2. Prior Art

In conventional cordless irons, a thermosensitive element is provided in an iron, and a temperature control circuit receiving a signal from the thermosensitive element is provided in a stand, whereby the temperature of the base portion of the iron is controlled while the iron is on the stand. However, since the amount of current flowing via the thermosensitive element is small and the voltage value of the signal is also small, if the terminals of the iron and the stand oxidize, poor or unstable conduction therebetween is caused by such oxidized terminals. Moreover, since the temperature control of the cordless iron is apt to sustain undesirable noise influence, there is a disadvantage that the base temperature of the iron cannot be correctly controlled.

SUMMARY OF THE INVENTION

The present invention has been developed in order to remove the above-described, drawback inherent to the conventional cordless irons.

It is, therefore, an object of the present invention to provide a new and useful cordless iron keeping satisfactory conduction between connecting terminals of cordless iron.

It is another object of the invention to provide a cordless iron in which the base temperature of an iron can be correctly controlled.

In accordance with the present invention there is provided a cordless iron assembly comprising: a hand-held iron portion including: an iron base; a heater device for heating the iron base; a thermosensitive transducing device for sensing the temperature of the iron base thereby outputting a temperature signal; temperature detecting circuitry responsive to the temperature signal for producing a pulse signal, an interval between two adjacent pulses in the pulse signal being changed in accordance with the temperature signal; and a first electrode arrangement for receiving electrical power to be supplied to the heater means and for outputting the pulse signal; and a stand including: a second electrode arrangement connectable with the first electrode arrangement, the second electrode arrangement being provided for supplying the electrical power to the first electrode arrangement and for receiving the pulse signal; a pulse signal detecting circuit arrangement for detecting the pulse signal received via the first and second electrode arrangement when the hand-held iron portion is attached to the stand; and temperature control circuitry responsive to the pulse signal for controlling energization of the heater device, with the interval being compared with a predetermined time period, such that the heater device is energized when the interval is longer than the predetermined time period, and that the heater device is deenergized when the interval is shorter than the predetermined time period.

In accordance with the present invention there is also provided a cordless iron assembly comprising: a hand-held iron portion including: an iron base; a heater device for heating the iron base; a thermosensitive transducing device for sensing the temperature of the iron base thereby outputting a temperature signal; temperature detecting circuitry responsive to the temperature signal for producing a pulse signal, an interval between two adjacent pulses in the pulse signal being changed in accordance with the temperature signal, the temperature signal being superimposed on the electrical power supplying line of the temperature detecting circuit; and a first electrode arrangement for receiving electrical power to be supplied to the heater device and for outputting the pulse signal; and a stand including a: second electrode arrangement connectable with the first electrode arrangement, the second electrode arrangement being provided for supplying the electrical power to the first electrode arrangement and for receiving the pulse signal; pulse signal detecting circuitry for detecting the pulse signal received via the first and second electrode arrangements when the hand-held iron portion is attached to the stand; and temperature control circuitry responsive to the pulse signal for controlling energization of the heater device, with the interval being compared with a predetermined time period, such that the heater device is energized when the interval is longer than the predetermined time period, and that the heater device is deenergized when the interval is shorter than the predetermined time period.

In accordance with the present invention there is further provided a cordless iron assembly comprising: a hand-held iron portion including: an iron base; a heater device for heating the iron base; a thermosensitive transducing device for sensing the temperature of the iron base thereby outputting a temperature signal; temperature detecting circuitry responsive to the temperature signal for producing a pulse signal, the temperature detecting circuitry having switching circuitry whose impedance changes in accordance with the temperature signal whereby an interval between two adjacent pulses in the pulse signal being changed in accordance with the temperature signal; and a first electrode arrangement for receiving electrical power to be supplied to the heater device and for outputting the pulse signal; and a stand including: a second electrode arrangement connectable with the first electrode arrangement, the second electrode arrangement being provided for supplying the electrical power to the first electrode arrangement and for receiving the pulse signal; pulse signal detecting circuitry for detecting the pulse signal received via the first and second electrode arrangement when the hand-held iron portion is attached to the stand; and temperature control circuit means responsive to the pulse signal for controlling energization of the heater device, with the impedance being detected, such that the heater device is energized when the interval is longer than the predetermined time period, and that the heater device is deenergized when the interval is shorter than the predetermined time period.

BRIEF DESCRIPTION OF THE DRAWINGS

The object and features of the present invention will become more readily apparent from the following detailed description of the preferred embodiments taken in conjunction with the accompanying drawings in which.

The same or corresponding elements and parts are designated at like reference numerals throughout the drawings.

DETAILED DESCRIPTION OF THE INVENTION

Prior to describing the preferred embodiments of the present invention, the above-mentioned conventional cordless iron will be described for a better understanding of the present invention.

Figure 8:
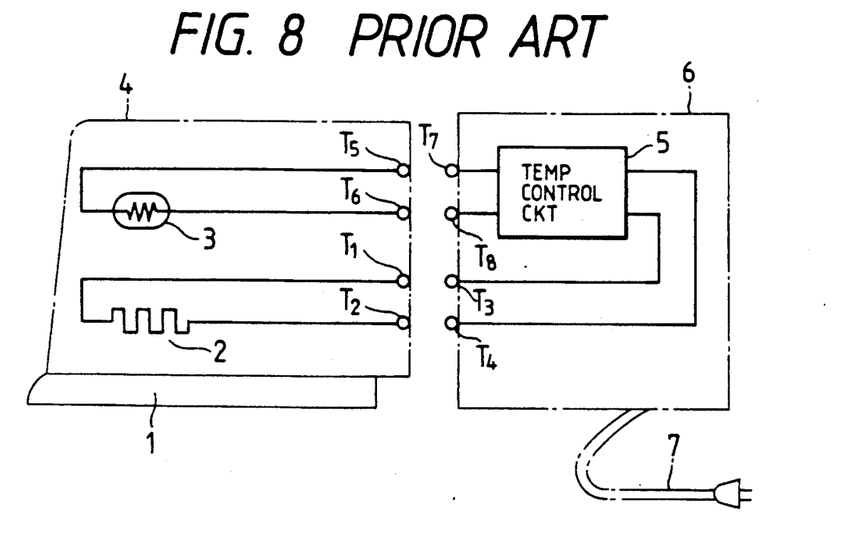
FIG. 8 is a schematic block diagram of a conventional cordless iron.

Referring now to FIG. 8, the conventional cordless iron generally comprises a hand-held iron portion (which is called iron hereinbelow) 4 and a stand 6. The iron 4 includes a base 1, a heater 2 for heating the base 1, a thermosensitive element 3 for sensing the temperature of the base 1, and terminals T1, T2, T5, and T6, and the stand 6 includes a temperature control circuit 5 for controlling the temperature of the heater 2, a cord 7 which is to be connected to power source for supplying electricity to the iron 4 via the stand 6, and terminals T3, T4, T7, and T8 which are to be respectively connected with the terminals T1, T2, T5, and T8. When the iron 4 is supported by the stand 6, the heater 2 is connected, via the terminals T1, T2, T3, and T4, to the temperature control circuit 5, and the thermosensitive element 3 is also connected, via the terminals T5, T6, T7, and T8, to the temperature control circuit 5. The temperature control circuit 5 controls the temperature of the heater 2 in accordance with a temperature signal from the thermosensitive element 3. When the iron 4 is removed from the stand 6, the iron is disconnected from the power source.

However, since the amount of current flowing in the thermosensitive element 3 is small (approximately several (microamperes) and the voltage value of the temperature signal is also small (approximately 5 V), if the terminals T5, T6, T7, and T8 of the iron 4 and the stand 6 oxidize, poor or unstable conduction therebetween is resulted from such oxidized terminals, and the temperature control of the base 1 is apt to sustain undesirable noise influences. Therefore, there is a disadvantage that the base temperature of the iron 4 cannot be correctly controlled.

Figure 1:
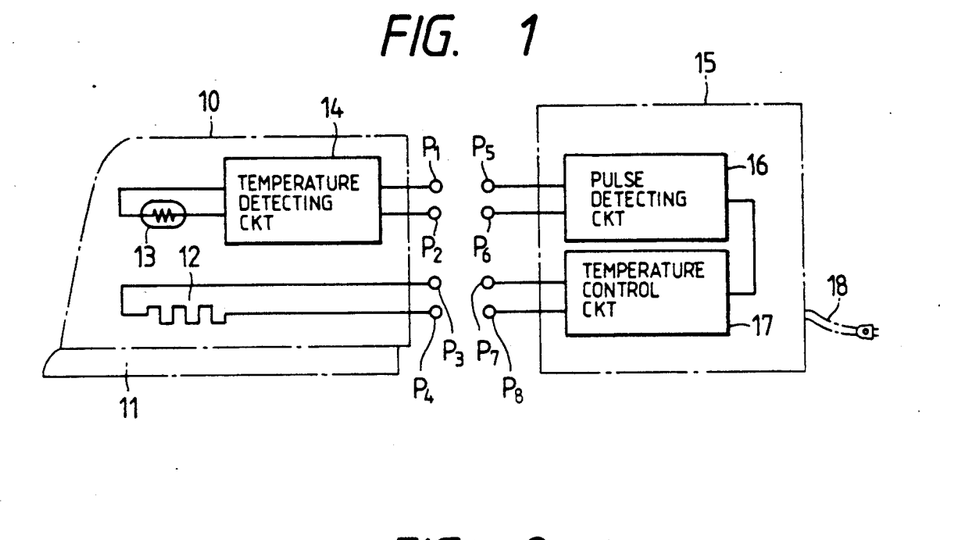
FIG. 1 is a schematic block diagram of a cordless iron according to the present invention.

FIG. 1 shows a schematic block diagram of a cordless iron assembly according to the present invention. The cordless iron assembly generally comprises a stand 15 and an iron 10 detachably supported on the stand 15. The iron 10 includes a base 11, a heater 12 for heating the base 11, a thermosensitive element 13, a temperature detecting circuit 14 for producing a pulse signal, terminals P1 and P2 for outputting the pulse signal, and terminals P3 and P4 for receiving electrical power to be supplied to the heater 12, and the stand includes a pulse signal detecting circuit 16, a temperature control circuit 17 for controlling energization of the heater 12, a cord 18, terminals P5 and P6 for receiving the pulse signal, and terminals P7 and P8 for supplying the electrical power to the terminals P3 and P4 while the iron 10 is attached to the stand 15.

Figure 2:
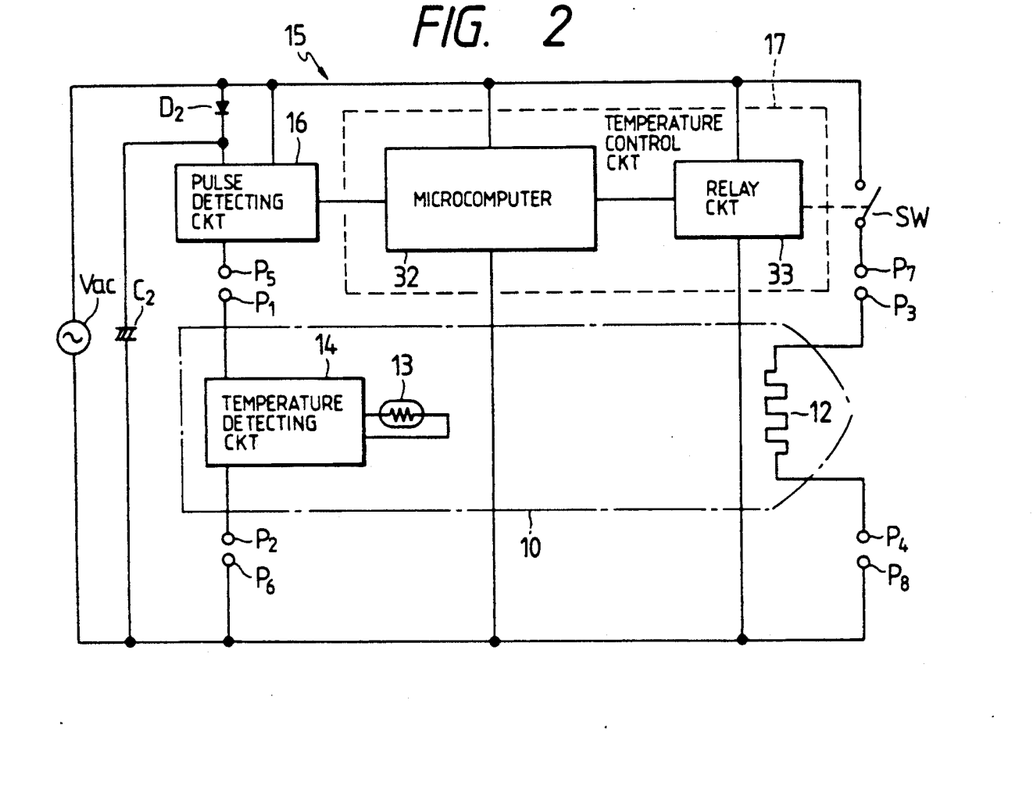
FIG. 2 is a block diagram of the circuit of the cordless iron.

In the above-mentioned structure, the operation of the cordless iron will be described with reference to FIG. 2. FIG. 2 is a circuit block diagram of the cordless iron assembly showing a state that a temperature control is performed while the iron 10 is on the stand 15. The temperature control circuit 17 includes a microcomputer 32 and relay circuit 33. When the iron 10 is supported on the stand 15, electrical power Vac is supplied to the heater 12 via the terminals P3, P4, P7, and P8, and also supplied to the temperature detecting circuit 14 via the terminals P1, P2, P5, and P6. The thermosensitive element 13 senses the temperature of the base 11 to produce a temperature signal. The temperature detecting circuit 14 includes a switching circuit having a transistor and resistors. The impedance of the switching circuit changes in accordance with the temperature signal outputted from the thermosensitive element 13. In this case, when the switching circuit is in ON state, the impedance reduces. This change of the impedance causes a change of current flowing into the switching circuit, i.e. switching period thereof changes in accordance with the temperature signal. As a result, the amount of current flowing into the temperature detecting circuit 14 increases in accordance with the period of the temperature signal thereby producing a pulse signal.

In the pulse signal detecting circuit 16, the pulse signal is received via the terminals P1, P2 , P5, and P6, and outputted to the temperature control circuit 17. In the temperature control circuit 17, the period of such current changes is detected, and the base temperature of the iron 10 is compared with a predetermined temperature. Here, an interval between two adjacent pulses in the pulse signal may be compared with a predetermined time period because the base temperature has a relation with the interval. When the base temperature is lower than such a predetermined value, a switch SW is closed with the relay circuit 33 being operated, and when the base temperature is higher than the predetermined value, the switch SW is opened with the relay circuit 33 being operated. In other words, the heater 12 is energized when the interval is longer than the predetermined time period, and is deenergized when the interval is shorter than the predetermined time period. Such operations are achieved by means of the microcomputer 32, and further detailed operation will be described with reference to a flowchart hereinafter. Thus, the temperature of the heater 12 is controlled.

Figure 3:
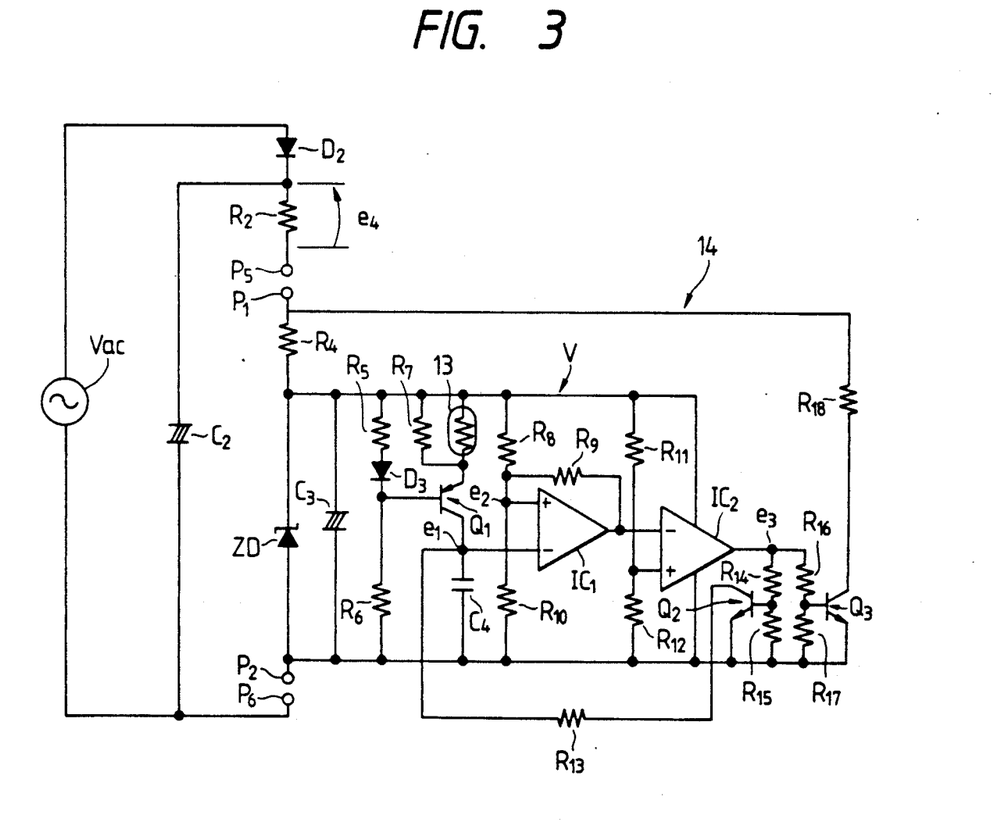
FIG. 3 is a circuit diagram of a temperature detecting circuit of FIG. 2.

FIG. 3 shows a circuit showing the temperature detecting circuit 14. An electrical power Vac is supplied to the iron 10 via the terminals P1, P2, P5, and P6. A power circuit is formed by a diode D2 and a capacitor C2 as a DC power circuit. Although the thermosensitive element 13 is in the temperature detecting circuit 14, the thermosensitive element 13 is practically provided at the outer portion of the temperature detecting circuit 14 for sensing the base temperature. Here, when the temperature of the thermosensitive element 13 increases, the resistance value of this element 13 becomes small. A constant current flows into the thermosensitive element 13 by means of resistors R5 and R6 and transistor Q1, and then a charge current flows into the capacitor C4. A resistor R7 is provided for compensating for the considerable increase of resistance value of the thermosensitive element 13 at a low temperature of the iron base 11, and a diode D3 is used for the temperature compensation of the transistor Q1. The terminal voltage of the capacitor C4 is connected to the inverting input terminal of the operational amplifier IC1. A reference voltage at the noninverting input terminal is produced by resistors R8 and R10, while another resistor R9 is connected between the output terminal and the noninverting input terminal of the same.

When the inverting input terminal voltage e1 of the operational amplifier IC1 is lower than the noninverting input terminal voltage e2 of the same, the output voltage of the operational amplifier IC1 becomes high. At this time, assuming that the noninverting input terminal voltage e2 is e2H, this is given by:

$$e2H \approx V \cdot \frac{R10}{\frac{R8 \cdot R9}{R8 + R9} + R10}$$

wherein V is a supply voltage of the operational amplifier IC1.

When the voltage e1 becomes higher than the voltage e2H by the charge of the capacitor C4, the output of the amplifier IC1 becomes low. Therefore, the voltage e2 is decreased. At this time, assuming that the voltage e2 is e2L, this is given by:

$$e2L \approx V \cdot \frac{\frac{R9 \cdot R10}{R9 + R10}}{R8 + \frac{R9 \cdot R10}{R9 + R10}}$$

wherein V is a supply voltage of the operational amplifier IC1.

A reference voltage at the noninverting input terminal of a comparator IC2 is produced by resistors R11 and R12, and the inverting input terminal of the comparator IC2 is connected to the output terminal of the amplifier IC1. Therefore, when the output of the amplifier IC1 is high, an output voltage e3 of the comparator IC2 is low, and when the output of the amplifier IC1 is low, the output e3 is high. The output terminal of the comparator IC2 is connected to resistors R14 and R16. A transistor Q2 is arranged to be driven by a voltage determined by resistors R14 and R15, and a transistor Q3 is arranged to be driven by a voltage determined by resistors R16 and R17. The collector of the transistor Q2 is connected, via the resistor R13, to the capacitor C4 whereby the electric charge of the capacitor C4 is discharged via the resistor R13 and the transistor Q2 when the output voltage e3 from the comparator IC2 is high.

Meanwhile, since the collector of the transistor Q3 is connected to resistor R18 whose resistance is small, when the voltage e3 is high, the transistor Q3 becomes active, and then current flows through the resistor R18 and the transistor Q3. As a result, impedance between the terminals P1 and P2 is considerably decreased. Thus, the transistor Q3 and the resistors R18, R16, and R17 operate as a switching circuit whose impedance changes in accordance with the temperature signal. It is to be noted that when the transistor Q3 is in OFF state, current corresponding to supply current of the temperature detecting circuit 14 flows into a resistor R2, and that when the transistor Q3 is in ON state, a current determined by the resistor R18 is added to the supply current. Accordingly, a voltage e4 across the resistor R2 is small when the transistor Q3 is in OFF state, and is large when the transistor Q3 is in ON state. In addition, a resistor R4, a Zener diode ZD, and a capacitor C3 are provided for avoiding the fluctuation of the supply voltage V of the amplifier IC1 due to the ON-OFF operation of the transistor Q3.

As will be understood from the above description, since the temperature signal can be superimposed on the electrical power supplying line directed to the temperature detecting circuit 14 of the iron 10, the circuit of the cordless iron can be provided with high reliability.

Figure 4A:
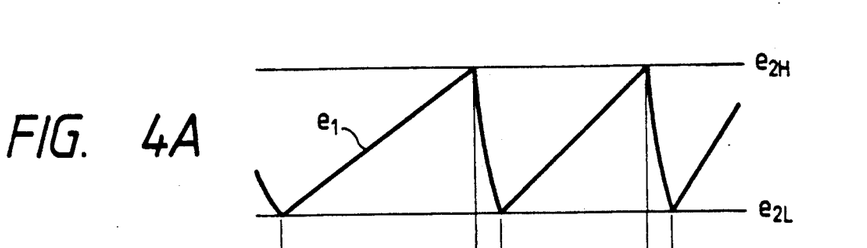
FIGS. 4A-4C are graphs showing waveforms of signals in the temperature detecting circuit for the better understanding of the invention.
Figure 4B:
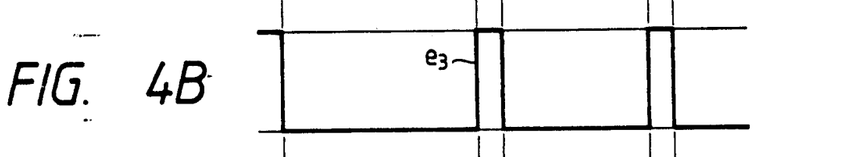
Figure 4C:
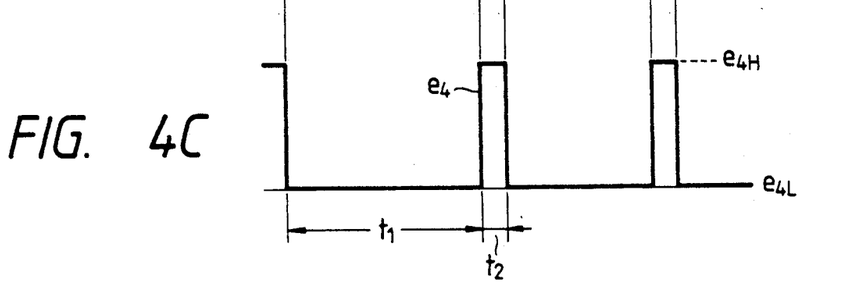

FIGS. 4A, 4B, and 4C are waveforms each showing the terminal voltage e1 of the capacitor C4, the output voltage e3 of the comparator IC2, and the voltage e4 across the resistor R2. During the charging of the capacitor C4, the voltage e1 linearly increases by the constant current. When the voltage e1 is lower than the voltage e2H of the noninverting input terminal of the operational amplifier IC1, the output voltage e3 of the comparator IC2 is low. At this time, since the transistor Q3 is in OFF state, only small current flows into the resistor R2, whereby the voltage e4 becomes also small. When the voltage e1 reaches the voltage value e2H with the voltage e1 being increased, the output voltage e3 of the comparator IC2 becomes high, and the transistor Q3 becomes active. At this time, since large current flows into the resistor R2, the voltage e4 becomes large.

When the voltage e3 becomes high at this moment, the transistor Q2 becomes active so that the electric discharge of the capacitor C4 is performed by means of the resistor R13 and the transistor Q2. When the voltage e1 reaches the voltage value e2L with the voltage e1 being decreased by the discharge, the output of the amplifier IC1 becomes high level again, and the output of the comparator IC2 becomes low. Therefore, the transistor Q3 is turned OFF whereby the electrical charge is caused again. Thus, the electric charge and discharge of the capacitor C4 are performed. Accordingly, when the transistor Q3 is turned ON, the voltage e4 becomes large (e4H), and when the transistor Q3 is turned OFF, the voltage e4 becomes small (e4L) as shown in FIG. 4C. Here, it is assumed that an interval between two adjacent pulses in the waveform of the voltage e4 is t1, and that a pulse width thereof is t2.

Figure 5:
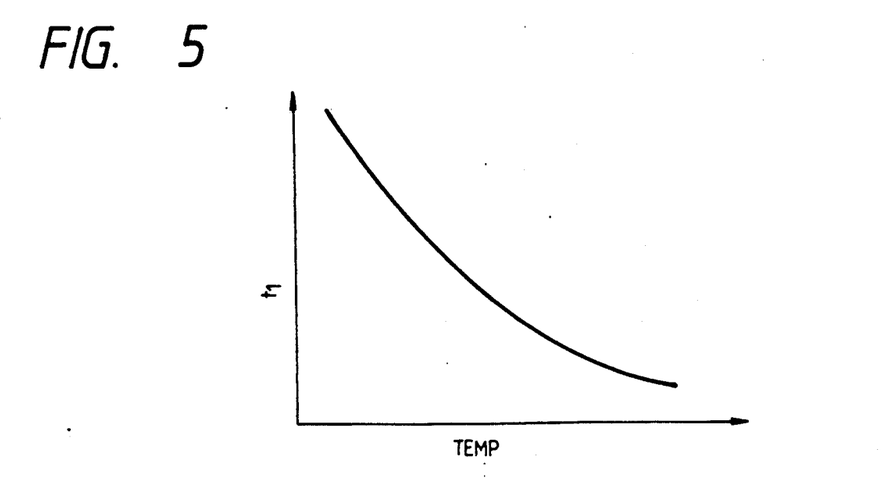
FIG. 5 is a graph showing the relationship between the base temperature of the iron and the interval between two adjacent pulses in a pulse signal produced by the temperature detecting circuit.

Now the detection of the base temperature will be described. FIG. 5 is a graph showing the relationship between the base temperature of the iron 10 and the low level time period t1 of the voltage e4. The base temperature of the iron 10 is detected by measuring the time period t1, i.e. a low level time period of the voltage e4. Since the resistance value of the thermosensitive element 13 decreases in accordance with the increase of the base temperature, the charging time period of the capacitor C4 becomes short whereby the time period t1 becomes short. This time period t1 is approximately presented by the following formula.

$$t1 = \frac{\Delta V}{V - VE} \cdot \frac{Rth \cdot R7}{Rth + R7} \cdot C4$$

$$\Delta V = e2H - e2L$$

wherein V is supply voltage of the amplifier IC1; VE is emitter voltage of the transistor Q1; and Rth is resistance value of the thermosensitive element 13.

Figure 6:
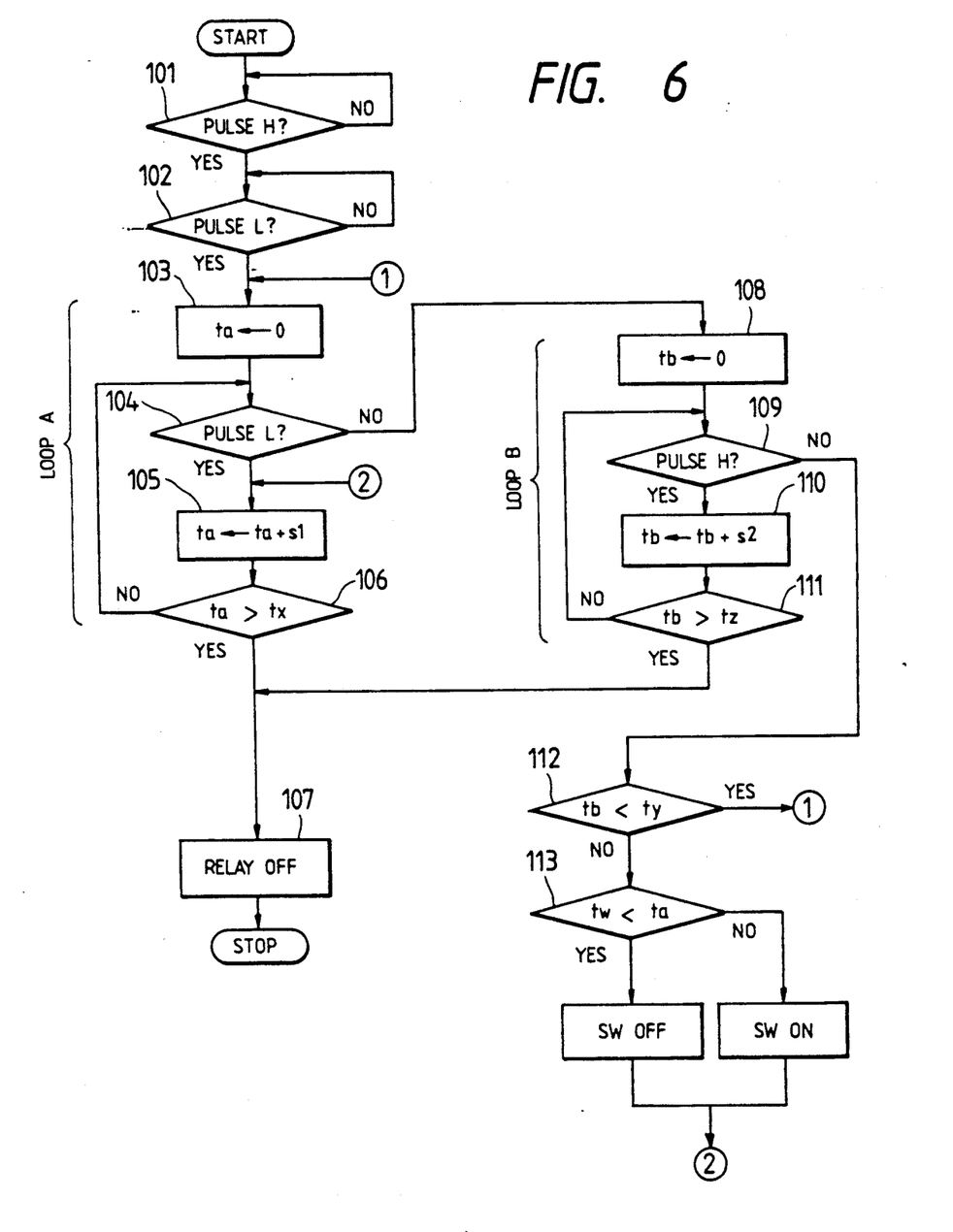
FIG. 6 is a flowchart showing the operation of the temperature control circuit.

In the temperature control circuit 17, the base temperature is controlled by detecting the time period t1. FIG. 6 is a flowchart showing an operational program of the temperature control circuit 17. In a step 101 of the flowchart, it is detected that whether or not the pulse signal of the resulted voltage e4 is at a high level, and this step 101 is repeated until high level is detected. In a step 102 following the step 101, it is detected that whether or not the pulse signal is at a low level, and this step 102 is repeated until low level is detected. In these steps 101 and 102, the beginning of the pulse signal is determined. In a step 103 following the step 102, a variable ta for the measurement of the time period t1 is determined as 0 to set the beginning of a time interval to be measured. In a step 104 following the step 103, it is determined whether or not the pulse signal is in low level. If the pulse is in low level, the program advances to a step 105, and if the pulse is in high level, the program advances to a step 108.

In the step 105, a constant s1 representing an executing time period which is required for a loop A is added to a present variable ta. In the step 106 following the step 105, it is determined whether or not the resulted variable ta is larger than a predetermined constant tx representing a time period determined as abnormally long time period t1. If the variable ta is larger than the predetermined constant tx, i.e. the variable ta is abnormally large, the program advances to a step 107. In the step 107, the switch SW is opened with the relay circuit 33 being controlled. If the variable ta is smaller than the constant tx, the program advances to the step 104 again thereby making one loop A for the detection of the time period t1. Thus, if the time period t1 is excessively longer than the predetermined time period tx, the supply of electrical power directed to the heater 12 is stopped, i.e. the heater 12 is deenergized for the safe operation of the cordless iron assembly.

In the step 108, a variable tb for the measurement of the time period t2 is determined as 0 to set the beginning of a time interval to be measured. In a step 109 following the step 108, it is determined whether the pulse signal is in high level or not. If the pulse is in high level, the program advances to a step 110, and if the pulse is in low level, the program advances to a step 112. In the step 110, a constant s2 representing an executing time period which is required for a loop B is added to a present variable tb. In the step 111 following the step 110, it is determined whether or not the resulted variable tb is larger than a predetermined constant tz representing a time period determined as abnormally long time period t2. If the variable tb is larger than the predetermined constant tz, i.e. the variable tb is abnormally large, the program advances to the step 107. If the variable tb is smaller than the constant tz, the program advances to the step 109 again thereby making one loop B for detection of the time period t2.

Here, the pulse width, or the time period t2 is constant, because t2 is determined by a time period in which the terminal voltage e1 of the capacitor C4 decreases from the voltage level e2H to the voltage level e2L when the transistor Q2 is turned ON. The pulse width t2 is given by:

$$t2 = -R13 \cdot C4 \cdot \ln \frac{e2L}{e2H}$$

Thus, if the pulse width t2 is excessively wider than the predetermined time period t2, the supply of electrical power directed to the heater 12 is stopped, i.e. the heater 12 is deenergized for the safe operation of the cordless iron assembly.

In the case that the pulse width t2 is very narrow with undesirable noise being detected by the temperature control circuit 17, this very narrow pulse width is disregarded in the step 112. In this step 112, it is determined whether or not a resulted variable tb is smaller than a predetermined constant ty representing a time period of the determination of such pulse disregard. When the variable tb is smaller than the predetermined constant ty, the program advances to the step 105, and when the variable tb is larger than the constant ty, the program advances to a step 113. In the step 113, the time period ta is compared with a predetermined time period tw indicative of a temperature which is set by the user. Then, if the predetermined time period tw is shorter than the time period ta, the program advances to the step 114, and then the switch SW is turned ON by means of the relay circuit 33. If the predetermined time period tw is longer than the time period ta, the program advances to the step 115, and then the switch SW is turned OFF by means of the relay circuit 33.

Thus, in the step 113, the base temperature of the iron 10 is compared with the predetermined temperature, i.e. the time period t1 is compared with a predetermined time period tw by means of a relation between the base temperature and the time period t1 as shown in FIG. 5. When the base temperature is lower than the predetermined value, a switch SW is closed with the relay circuit 33 being operated, and when the base temperature is higher than the predetermined value, the switch SW is opened with the relay circuit 33 being operated. In other words, the heater 12 is energized when the interval t1 is longer than the predetermined time period tw, and is deenergized when the interval is shorter than the predetermined time period tw.

As will be seen from the above, in the temperature control circuit 17, since unusual conditions of the cordless iron are also detectable, the present cordless iron assembly is safe and provides high reliability.

Figure 7A:
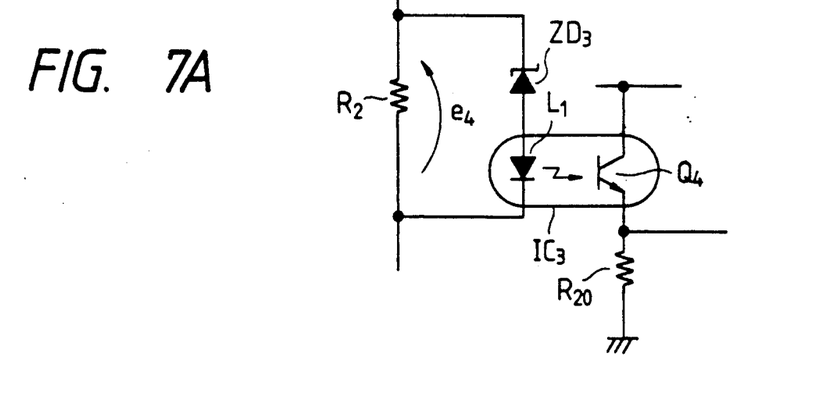
FIGS. 7A-7C are circuits respectively showing first to third embodiments of a pulse signal detecting circuit of FIG. 2.
Figure 7B:
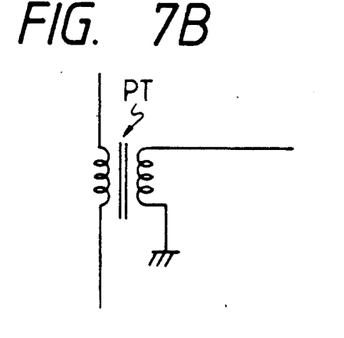
Figure 7C:
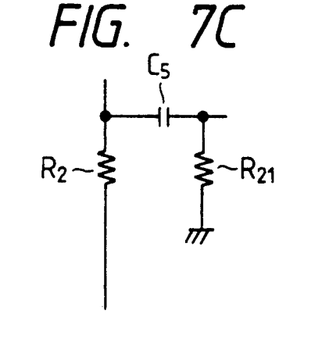

FIGS. 7A-7C are circuits respectively showing first to third embodiments of the pulse signal detecting circuit 16. In the first embodiment, a photocoupler IC3 includes an LED L1 and a phototransistor Q4, and a resistor R20 is connected to the emitter of the phototransistor Q4. When the current flowing into the R2 is small, since the voltage e4 is also small, no current flows into a Zener diode ZD3 and the LED L1, and no current flows into the resistor R20 so that the emitter voltage of the phototransistor Q4 of the photocoupler IC3 is 0V. When a large current flows into the resistor R2, the voltage e4 becomes large, and a current also flows into the LED L1 thereby the emitter voltage of the phototransistor Q4 becomes high. This emitter voltage is inputted into the microcomputer 32 in the temperature control circuit 17 for controlling the base temperature of the iron 10 as the above description.

In the second embodiment, a pulse transformer PT is used in place of the combination of the resistor R2, the Zener diode ZD3, the photocoupler IC3, and the resistor R20 in the first embodiment. The change of current due to the temperature detecting circuit 14 can be detected from the secondary of the pulse transformer PT. In the third embodiment, a capacitor C5 and a resistor R21 are connected to one end of the resistor R2, whereby the change of current caused by the temperature detecting circuit 14 can be detected.

It is apparent that the base temperature can be controlled by using the pulse signal produced in the temperature detecting circuit 14 provided in the iron 10 so that a cordless iron having no, poor or unstable conduction can be provided. Therefore, in the present invention, the base temperature can be correctly controlled.

In addition, in the temperature detecting circuit 14, an infrared-emitting diode may be provided between the transistor Q3 and the resistor R18. In this case, a light receiving element is provided in the pulse detecting circuit 16 whereby a pulse signal caused by the current change in the temperature detecting circuit 14 can be detected. Besides, the thermosensitive element 13 can be provided in an astable multivibrator circuit. In this case, since the oscillation period of the astable multivibrator changes in accordance with the temperature of the heater 12, the control of the base temperature is achieved by utilizing such change.

The above-described embodiments are just examples of the present invention, and therefore, it will be apparent for those skilled in the art that many modifications and variations may be made without departing from the scope of the present invention.

What is claimed is:

1. A cordless iron assembly comprising:
   (a) a hand-held iron portion including:
      i) an iron base;
      ii) heater means for heating said iron base;
      iii) thermosensitive means for sensing the temperature of said iron base thereby outputting a temperature signal;
      iv) temperature detecting circuit means responsive to said temperature signal for producing a plurality of pulses with variable intervals between adjacent pulses;
      v) first electrode means for receiving an electrical power to be applied to said heater means;
      vi) signal outputting means for outputting said pulse signal from said temperature detecting circuit means;
   (b) a stand including:
      i) second electrode means connectable with said first electrode means, said second electrode means applying said electrical power to said first electrode means;
      ii) signal inputting means connectable with said signal outputting means;
      iii) pulse signal detecting circuit means for detecting the received pulse signal by connection between said signal outputting means and said signal inputting means when said hand-held iron portion is attached to said stand; and
      vi) temperature control circuit means responsive to said pulse signal for controlling energization of said heater means, with means for measuring an interval between two pulses so that said pulse interval is compared with a predetermined time period, such that said heater means is energized when said pulse interval is longer than said predetermined time period, and that said heater means is de-energized when said interval is shorter than said predetermined time period.

2. A cordless iron assembly as claimed in claim 1, wherein said temperature control circuit means further controls said temperature of said heater means such that said heater means is de-energized when said interval in said pulse signal is longer than another predetermined time period which is longer than said predetermined time period.

3. A cordless iron assembly as claimed in claim 1, wherein said temperature control circuit means further controls said temperature of said heater means such that said heater means is de-energized when a width of said pulse signal is greater than another predetermined time period.

4. A cordless iron assembly as claimed in claim 1, wherein said pulse inverter varies in accordance with said temperature signal and said temperature signal is superimposed on a supply line of a power source voltage of said temperature detecting circuit means.

5. A cordless iron assembly comprising:
   (a) a hand-held iron portion including:
      i) an iron base;
      ii) heater means for heating said iron base;
      iii) thermosensitive means for sensing a temperature of said iron base thereby outputting a temperature signal;
      iv) temperature detecting circuit means responsive to said temperature signal for producing a plurality of pulses with variable intervals between adjacent pulses, said temperature detecting circuit means including a switching circuit whose OFF time period varies in accordance with an interval between two adjacent pulses;
      v) first electrode means for receiving an electrical power to be applied to said heating means;
      vi) signal outputting means for outputting said pulse signal supplied from said temperature detecting circuit means;
   (b) a stand including:
      i) second electrode means connectable with said first electrode means, said second electrode means supplying said electrical power to said first electrode means;
      ii) signal inputting means connectable with said signal outputting means;
      iii) pulse signal detecting circuit means for detecting said pulse signal received by the connection between said signal outputting means and said signal inputting means when said hand-held iron portion is attached to said stand;
      vi) temperature control circuit means responsive to said pulse signal for controlling energization of said heater means, said temperature control circuit means detecting the OFF time period of said switching circuit so that said heater means is energized when the OFF time period of said switching circuit is longer than a predetermined time period and de-energized when it is shorter than said predetermined time period.

6. A cordless iron assembly as claimed in claim 5, wherein said temperature control circuit means further controls said temperature of said heater means such that said heater means is de-energized when said interval in said pulse signal is longer than another predetermined time period which is longer than said predetermined time period.

7. A cordless iron assembly as claimed in claim 5, wherein said temperature control circuit means further controls said temperature of said heater means such that said heater means is de-energized when a width of said pulse signal is greater than another predetermined time period.

8. A cordless iron assembly as claimed in claim 5, wherein said pulse inverter varies in accordance with said temperature signal and said temperature signal is superimposed on a supply line of a power source voltage of said temperature detecting circuit means.

9. A cordless iron assembly as claimed in claim 5, wherein the connection between said signal outputting means and said signal inputting means is accomplished by pulse signal deriving means comprising a Zener diode and a photocoupler.

10. A cordless iron assembly as claimed in claim 5, wherein the connection between said signal outputting means and said signal inputting means is accomplished by pulse signal deriving means comprising a pulse transformer.

11. A cordless iron assembly as claimed in claim 5, wherein the connection between said signal outputting means and said signal inputting means is accomplished by pulse signal deriving means comprising a capacitor.

* * * * *